June 9, 1964   M. KUTS   3,136,675
METHOD OF MAKING ELASTOMERIC BAND TUBING FROM FLAT SHEETING
Filed Nov. 23, 1960   2 Sheets-Sheet 1
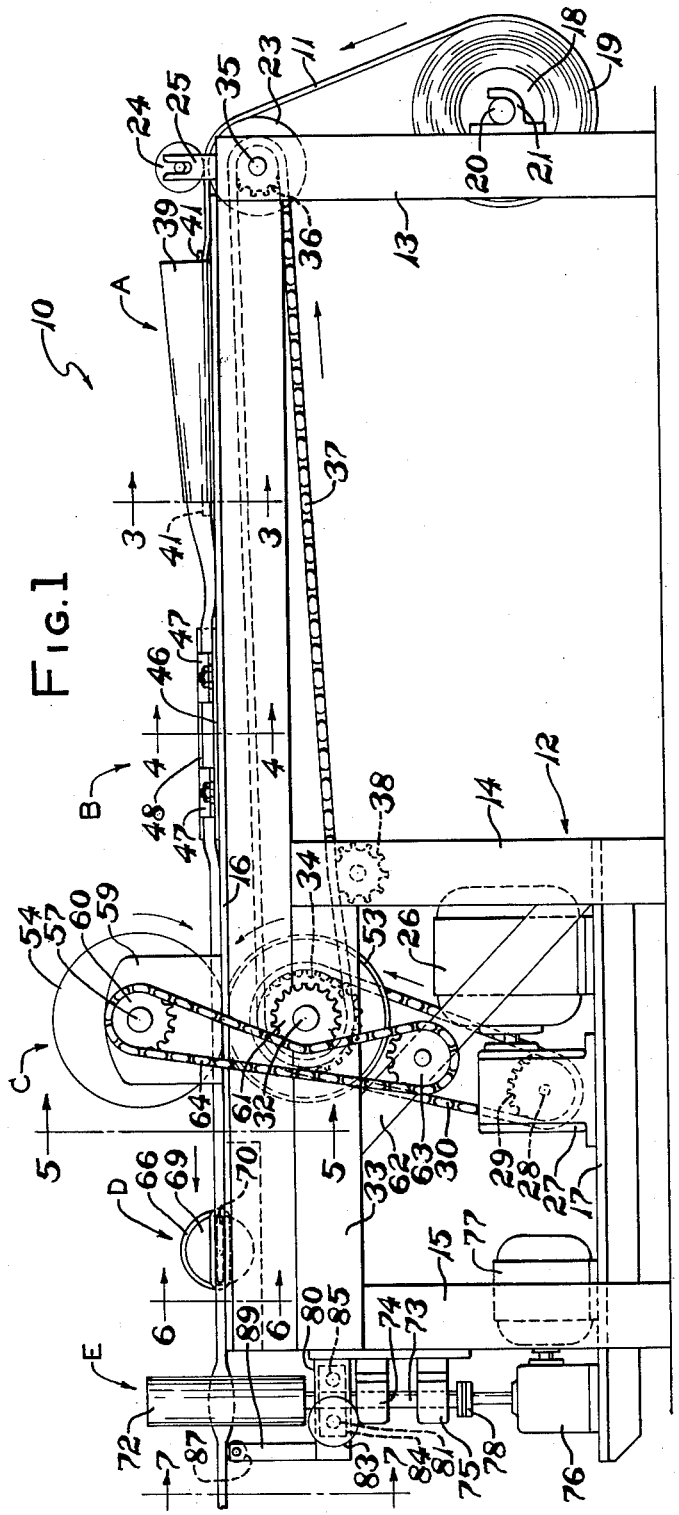
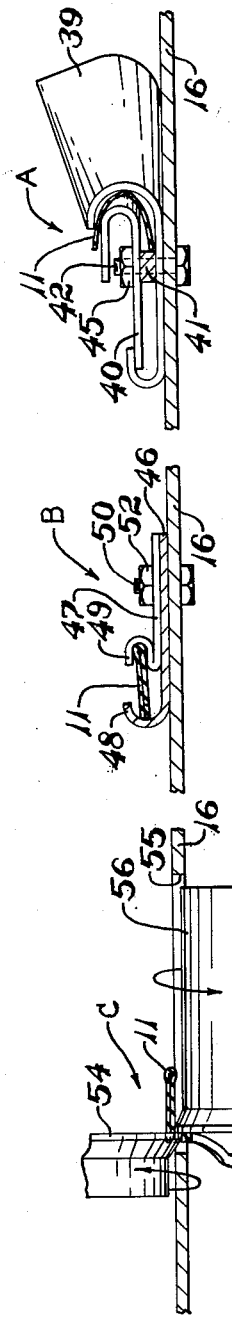
INVENTOR.
MATHEW KUTS
BY
ATTY.

June 9, 1964 M. KUTS 3,136,675
METHOD OF MAKING ELASTOMERIC BAND TUBING FROM FLAT SHEETING
Filed Nov. 23, 1960 2 Sheets-Sheet 2
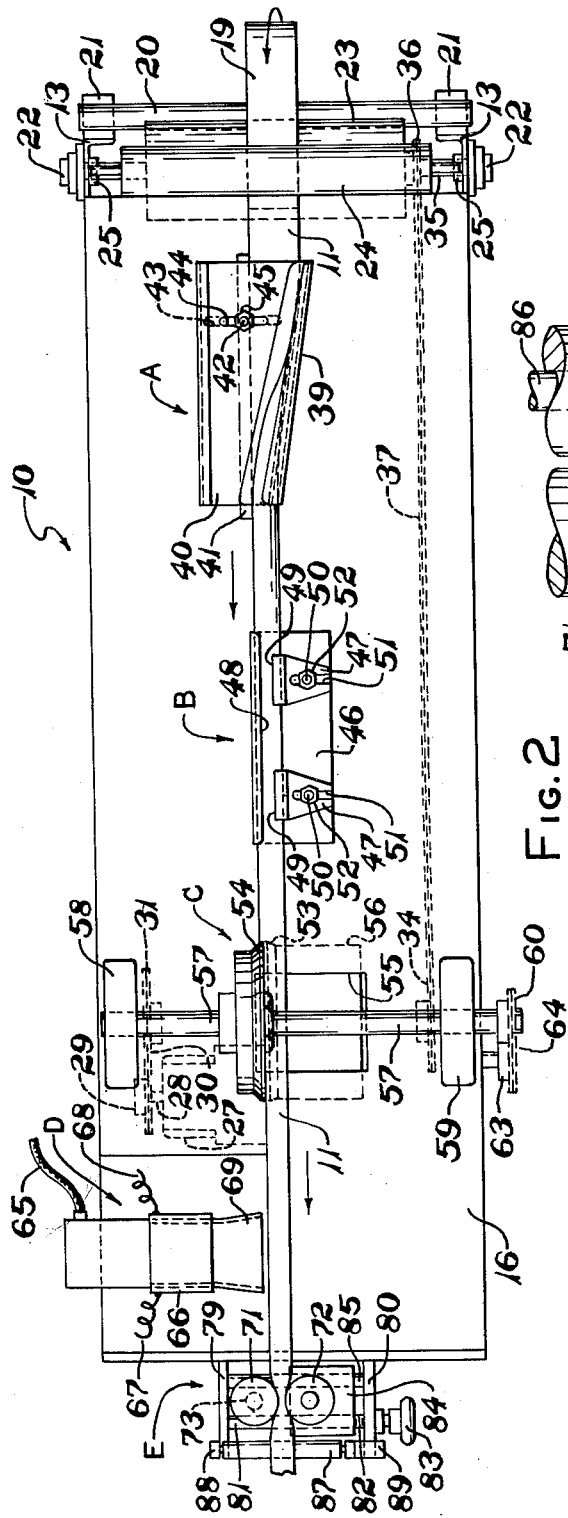
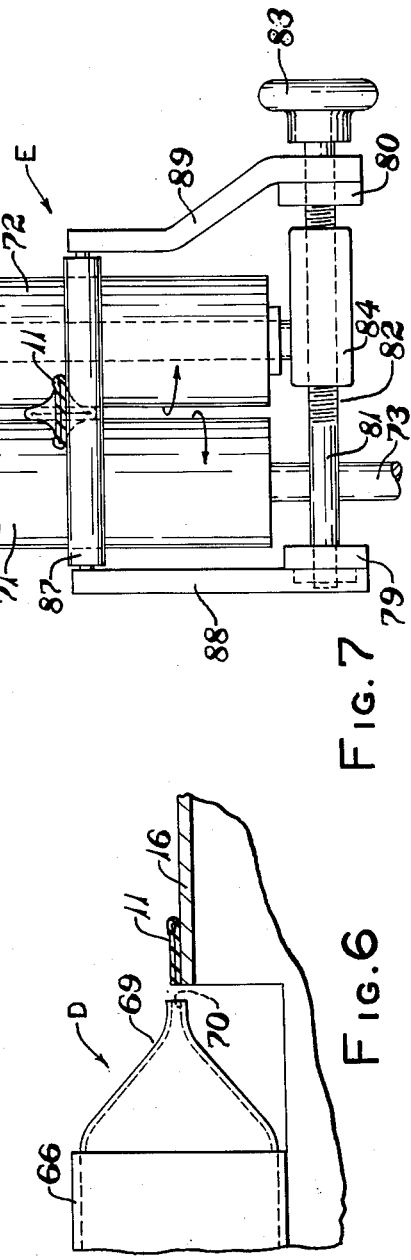
INVENTOR.
MATHEW KUTS
BY
W. A. Shira Jr.
ATTY.

United States Patent Office 3,136,675
Patented June 9, 1964

3,136,675
METHOD OF MAKING ELASTOMERIC BAND TUBING FROM FLAT SHEETING
Mathew Kuts, Akron, Ohio, assignor to The B. F. Goodrich Company, New York, N.Y., a corporation of New York
Filed Nov. 23, 1960, Ser. No. 71,230
8 Claims. (Cl. 156—203)

This invention relates to the manufacture of seamed elastomeric tubing and, more particularly, to the seaming of thin wall elastomeric tubing suitable for subsequent transverse shearing to form rubber bands.

Presently, in the production of rubber band tubing, calendered rubber sheeting is longitudinally folded upon itself and the free edges of the folded sheet are trimmed away to thereby provide aligned square edges and force the adjacent corners of said edges into close contact. The trimmed edges of the folded sheet are then provided with rubber cement, and the cemented sheet travels on a long conveyor, normally in the range of 50 to 60 feet in length, to allow the cement to dry. Upon leaving the conveyor the folded and cemented sheet is rotated 90 degrees about a line parallel to the direction of its travel so that the trimmed and cemented edges lie in the center of the upper portion of the folded strip. The sheet is then trained over an anvil at which point the cemented edges, which are now in abutting relationship to one another, are subjected to the action of a high frequency vibrating hammer which forces the two abutting edges together into adhering relationship forming a longitudinal seam in the folded sheet.

This method of tubing manufacture has had definite disadvantages. For example, the manufacturing space occupied by the equipment has been excessive due to the necessity for having a long cement drying conveyor sytem. Moreover, the use or rubber cement has created the usual problems incidental thereto such as fumes, fire hazards, and the accumulation of drippings on the conveyor system. The latter has necessitated frequent cleaning of the equipment to prevent the sheet from sticking and jamming the conveyors or their mechanisms during operation. Furthermore, the high frequency vibrating hammer has been a source of maintenance trouble because of mechanical breakdown caused by the vibrational forces set up in the associated equipment. The most serious difficulty, however, has been in the quality of the seam made in the tubing. Thus, if the cement applied to the trimmed edges of the sheet had not dried sufficiently prior to hammering the seam, the seam could easily part in subsequent handling and trimming operation. On the other hand, if the drying was expedited by employing less cement, frequently an insufficient quantity would be applied with the result that the cemented edges were not properly tackified and the hammering action on the edges wasn't capable of forming a welded seam.

Through the use of this invention it is possible, by utilizing but a small portion of the manufacturing space heretofore needed, to produce rubber band tubing having a seam which is stronger, following vulcanization, than the rubber sheeting itself without the necessity for applying rubber cements or hammering the seam. Thus, tensile tests conducted on rubber band tubing specimens fabricated in accordance with this invention have indicated transverse seam strength approximately 30% greater than strengths developed in tests of tubing seams made by prior methods.

The principal object of this invention is therefore, to provide an improved method and apparatus for fabricating rubber band tubing from elastomeric sheeting in a manner such that the edges of the sheeting are butt spliced to one another without the necessity for cementing the edges to be spliced, thus eliminating the heretofore customary long cement drying period and the apparatus for providing it.

Another object of this invention is to provide a method and apparatus for fabricating rubber band tubing from calendered elastomeric sheeting wherein the edges of said sheeting are heat softened and butt spliced as part of a continuous operation.

A further object of this invention is to provide a method and apparatus for fabricating elastomeric band tubing from flat sheeting wherein the edges of said sheeting are trimmed to a predetermined width, the trimmed edges are subjected to the impingement of gaseous medium at an elevated temperature to thereby heat soften said edges, and the heated edges are forced into abutting, cohering relationship to one another.

Further objects and advantages of the invention will be apparent to those skilled in the art to which this invention pertains from the following description in which reference is had to the accompanying drawings wherein:

FIG. 1 is a side elevational view of an apparatus constructed in accordance with this invention and capable of performing the method thereof;

FIG. 2 is a plan view of the apparatus shown in FIG. 1;

FIG. 3 is a fragmentary cross-sectional view taken along line 3—3 of FIG. 1 showing the means to fold the sheeting, and the sheeting being folded therein;

FIG. 4 is a fragmentary cross-sectional view taken along line 4—4 of FIG. 1 showing sheet guiding means;

FIG. 5 is a fragmentary cross-sectional view taken along line 5—5 of FIG. 1 showing the edges of the folded sheet being trimmed by rotary knives;

FIG. 6 is a fragmentary cross-sectional view taken along line 6—6 of FIG. 1 showing the nozzle for directing fluid at an elevated temperature on the trimmed edges of the folded sheet; and FIG. 7 is a fragmentary cross-sectional view taken along line 7—7 of FIG. 1 showing, on a larger scale, the mechanism for butt splicing the trimmed and heated edges of the folded sheeting.

The presently preferred form of an apparatus embodying this invention is illustrated in the drawings as an apparatus 10 comprising five basic components for cooperatively manipulating calendered elastomeric sheeting 11 and forming it into a tube as the sheeting is moved in the direction of its length. These components are: a sheet folding trough A, a channeling guide B, a rotary edge trimmer C, a fluid heater and director D, and an edge splicer E. In operation of such an apparatus, as elastomeric sheeting 11 is caused to be conveyed continuously therethrough, tube building operations are progressively and automatically performed on each moving longitudinal increment thereof.

The apparatus 10 includes a frame 12, comprising pairs of upright vertical stanchions 13, 14 and 15 supporting a horizontal platform 16 on their upper ends. A motor support platform 17 is mounted between the lower portions of stanchions 14 and 15. A drum 18 on which a supply roll 19 of the elastomeric sheeting 11 is wound is rotatably and removably supported at one end of the apparatus 10 by means of a roller 20 which passes through the drum 18 and is horizontally cradled in yokes 21 mounted on stanchions 13.

Journalled between the upper ends of stanchions 13 by means of bearings 22 mounted thereon is a horizontal rotatable friction roll 23 over which a floating pressure roll 24 is rotatably mounted axially parallel thereto by means of slotted roll support brackets 25 mounted on the upper extremities of stanchions 13. Thus, as the sheeting 11 is advanced over the friction roll 23 it is held in frictional engagement therewith by the downward force of the floating pressure roll 24.

Friction roll 23 and the rotary trimmer C are both driven by means of a drive motor 26 which is mounted on the support platform 17. The motor 26 is connected to a speed reducer 27 also mounted on platform 17. On the output shaft 28 of reducer 27 is mounted a drive sprocket 29. Sprocket 29 is connected by means of an endless drive chain 30 with a second sprocket 31 mounted on a horizontal shaft 32 rotatably mounted below platform 16 by means of frame side supports 33. Also mounted on shaft 32 is a third sprocket 34. Mounted on one of the arbors 35 of friction roll 23 is a fourth sprocket 36 which is rotated by means of an endless chain 37 passing about sprockets 34 and 36. Tension is maintained on chain 37 by means of an idler sprocket 38 mounted on one of the stanchions 14 adjacent the path of the chain 37.

Mounted on the platform 16 in the path of the moving sheeting 11 is the sheet folding trough A which comprises an outer curved rigid member 39 and an inner curved rigid member 40 separated from the outer member 39 by means of an elongated spacer 41. Both members 39 and 40 are held adjustably in position on platform 16 by means of a bolt 42 passing through a slot 43 in member 39, through the spacer 41, through a slot 44 in the inner member 40, and a nut 45. The slots 43 and 44 allow the members 39 and 40 to be laterally spaced from one another to compensate for various widths of sheeting 11.

Also mounted on platform 16 in the path of the sheeting 11 is an elongated guide B which comprises a fixed lower member 46 and a pair of adjustable upper members 47. Lower member 46 has a curled edge 48 to guide the abutting free edges of the folded sheeting 11. The upper members 47 also each have a curled edge 49 and are adjustably held in place by means of bolts 50 which pass through members 46, slots 51 in members 47 and nuts 52. The curled edge 49 of each of the upper members 47 guides the folded edge of the moving sheeting 11.

The folded sheeting 11 is trimmed to the proper folded width by means of a pair of overlapping, contrarotating, rotary knives 53 and 54. The knife 53 is mounted on shaft 32 beneath the platform 16. Above the knife 53 a rectangular opening 55 is formed in the platform 16 providing room for an arcuate portion of the knife 53 to protrude upward above the level of the platform 16. Also mounted on shaft 32 adjacent to the knife 53 is a drum 56 which also partially protrudes through the opening 55 and serves to provide a moving support for the folded sheeting 11 as it moves into and through the bight of the knives 53 and 54. Above the platform 16, axially parallel to the shaft 32, a second shaft 57 is rotatably mounted by means of vertical bearing supports 58 and 59. The knife 54 is located generally centrally on shaft 57 in position for cooperative overlapping shearing engagement with the knife 53 in a plane lying between the sheet guiding surfaces of guide members 48 and 49. On the end of the shaft 57, which extends beyond the bearing support 59, a sprocket 60 is mounted. A sprocket 61 is likewise mounted on the adjacent end of shaft 32 which extends beyond its journal in side supports 33. Rotatably mounted on a diagonal frame brace 62 is an idler sprocket 63. Passing about sprockets 60, 61 and 63 is a drive chain 64 so arranged as to rotate knife 54 in the opposite direction to the rotation of knife 53 as shaft 32 is driven by motor 26.

The trimmed edges of the sheeting 11 are heat softened by passing them through a jet of hot air directed upon them by means of the heater and director D, which is mounted in the platform 16 axially perpendicular to the direction of travel of the sheeting 11. The heater and director D may comprise merely a chamber connected to a source of high pressure air, not shown, by a suitable hose 65. The air may be supplied to the chamber in heated condition. Preferably, however the air is supplied at ambient temperature and is heated in the chamber by an electrical heating element 66 which surrounds the chamber and is supplied with electricity by means of wires 67 and 68. A nozzle 69 having a narrow orifice 70, elongated in the direction of travel of the sheeting 11, is mounted at one end of the chamber. The end of the nozzle 69 is situated closely adjacent to the position of the trimmed edges of the sheeting 11 so that hot air coming from the nozzle 69 impinges directly upon the moving trimmed edges.

The folded, trimmed sheeting 11, with its heat softened trimmed edges, is then drawn between a pair of adjustable spaced splicing rolls 71 and 72 which are rotatable about their respective parallel vertical axes. In passing between these rolls, which are preferably spaced apart approximately the thickness of the folded sheet 11, the folded sheet 11 is flattened in a longitudinal plane which is perpendicular to the original plane of the folded sheet. Thus, the heat softened edges are positioned in the center of the folded sheet 11 and forced into abutting contact with one another so that the cohesive force between the edges knits them firmly together.

Roll 71 is mounted on the end of a vertical rotatable shaft 73 which is journalled in vertically coaxial pillow blocks 74 and 75 mounted on the end of the frame 12. A gear reducer 76, mounted on support platform 17 and driven by a motor 77, is connected to the lower end of the shaft 73 by means of a shaft coupling 78. Extending horizontally from the end of the frame 12, to either side of the rolls 71 and 72, are a pair of support brackets 79 and 80. Rotatably mounted between brackets 79 and 80, as seen in FIG. 7, is a threaded shaft 81 having a threaded portion 82, and an adjusting hand wheel 83 mounted on one end. Movably engaged with the threaded portion 82 is a horizontal plate 84 slidably mounted on a horizontal slider rod 85 mounted between brackets 79 and 80 and parallel to shaft 81. Vertically mounted on the upper side of the horizontal plate 84 is a shaft 86 on which the splicing roll 72 is rotatably mounted. Thus, the spacing between the splice rolls 71 and 72 may be adjusted by turning the hand wheel 83 manually.

Adjacent the splicing rolls 71 and 72 is a horizontal rotatable support roll 87 which supports the butt spliced tubing emanating from the splicing rolls. This support roll 87 is supported by means of a pair of vertical brackets 88 and 89 mounted at the outer end of horizontal brackets 79 and 80, respectively.

In performing the method of this invention with the illustrated apparatus, the operator first places a roll 19 of calendered sheeting 11 on the roller 20 which is cradled in its yokes 21 at one end of the machine. He then takes a free end of the sheeting 11, and passes it between the friction roll 23 and the pressure roll 24. He then pulls the end through the sheet folding trough A and the channeling guide B. At this time he starts the motors 26 and 77. He feeds the folded edges of the sheet 11 adjacent the end thereof through the bight of the contra-rotating knives 53 and 54, allowing the trimmed scrap to fall away under the force of gravity into a suitable receptacle, not shown. He then leads the trimmed folded sheet 11 past the nozzle 69 to and between the splicing rolls 71 and 72 and thence onto the support roll 87. The speed of rotation of the splicing roll 71 is so adjusted that it will draw the folded sheeting 11 between it and roll 72 at a speed such that the surface speed of the knives 53 and 54 match the speed of travel of the folded strip 11 therethrough. When this has been done, the operator turns on the heating element 66 of the fluid heater in director D and also opens a valve, not shown, to introduce air under pressure to the air feed line 65. Thus, as the folded trimmed sheet 11 coming from the rotary edge trimmer C passes in front of the heated air stream directed by the nozzle 69 of the fluid heater in director D the edges are heat softened and form a very small bead adjoining the adjacent trimmed edges. Then as the folded strip passes through the splicing rolls 71 and 72 the edges are forced into abutting cohering relationship, as previously described, forming a splice which, when cooled, in exceptionally strong, enabling the operator to handle the seamed tubing with ease. The seamed tubing may then be vulcanized in the conventional manner and the tubing cut transversely into finished rubber bands.

Although the invention has been described with references to a preferred apparatus suitable for effecting the novel method thereof, modifications, variations and other uses of the apparatus and other apparatus for performing the method will readily occur to those skilled in the art to which the invention pertains. Hence, the invention is not to be considered as limited to the details of the specifically described embodiment except as required by the spirit and scope of the appended claims.

I claim:

1. Apparatus for the production of elastomeric tubing from a sheet of elastomeric material, comprising means to move said sheet in the direction of its length, means acting on said sheet while moving in said direction to longitudinally fold said sheet and dispose its free edge portions in parallel superposed adjoining relationship with the side faces of said edge portions aligned in a common plane, means to heat soften said faces of the free edge portions, and means acting upon said sheet as it moves in said direction after the said free edge faces have been heat softened to move said edge portions from parallel adjoining into face abutting relationship.

2. A method for the production of elastomeric tubing by the continuous longitudinal seaming of a sheet of elastomeric material continuously moving in the direction of its length, comprising the following sequential steps simultaneously performed on portions of said sheet while it is moving in said direction: longitudinally folding said sheet to bring the edges thereof adjacent one another, simultaneously longitudinally trimming a portion from each of said edges to form fresh contiguous edge faces on the remaining portion of said folded sheet with said sheet faces disposed in a common plane, heat softening said faces, and forcing said contiguous edge faces into abutting and cohering relationship with one another.

3. A method for the production of vulcanized elastomeric tubing by the continuous longitudinal seaming of a strip of elastomeric material moving in the direction of its length, comprising the following sequential steps simultaneously performed on incremental portions of said strip while it is moving in said direction: longitudinally folding said strip to bring the edges thereof adjacent one another, simultaneously longitudinally trimming a portion from each of said edges to form fresh contiguous edges on the remaining portion of said strip while folded, impinging a stream of gas at an elevated temperature onto said contiguous edges, forcing said contiguous edges into abutting and cohering relationship with one another, and vulcanizing said strip.

4. Apparatus for producing unvulcanized elastomeric tubing by the continuous longitudinal seaming of a strip of unvulcanized elastomeric material while moving in the direction of its length, comprising, in combination, means to longitudinally fold said strip thereby bringing the edges of said strip into juxtaposition, trimming means to longitudinally trim a portion from each of said edges while in said juxtaposition and thereby form coplanar edge faces on the remaining portion of said strip, means to heat soften said edge faces, and means to butt splice the heat softened contiguous edge faces of said strip including means to move said edge faces from their coplanar position into facing contact.

5. Apparatus for the production of elastomeric tubing from a sheet of elastomeric material, comprising means to move said sheet in the direction of its length, means acting upon said sheet while moving in said direction to longitudinally fold said sheet with its free edges in parallel adjoining relationship, rotary knife means positioned on said apparatus in the path of movement of said sheet in said direction while folded, means to rotate said knife means in timed relationship to the speed of movement of said sheet in said direction to simultaneously trim both of said free edges while in said parallel adjoining relationship, means to heat soften the edges of said sheet following the trimming thereof by said knife means, and means acting upon said sheet in timed relationship to said speed of movement to move said edges from said adjoining relationship into abutting relationship.

6. Apparatus for continuously seaming unvulcanized elastomeric sheeting, comprising, in combination, means to move said sheeting in the direction of its length, trough means in the path of movement of said sheeting to longitudinally fold the latter during said movement, rotatable circular knives in the path of movement of said sheeting to longitudinally cut the latter in its folded condition, means to guide said sheeting in its folded condition to said knives from said trough means, means to direct a gas at an elevated temperature onto the edges of said sheeting after it is longitudinally cut as it is moved in said direction, rotatable butt splicing means in the path of movement of said sheeting to butt splice the edges of said sheeting following the direction of said gas upon said edges, means to rotate said butt splicing means, and means to rotate said circular knives in timed relationship to the movement of said sheeting in said direction.

7. Apparatus for the production of elastomeric tubing from a sheet of elastomeric material, comprising a support platform, means mounted on said platform to continuously move said sheet in the direction of its length over said platform, sheet folding means mounted on said platform in longitudinal alignment with the direction of movement of said sheet to fold said sheet upon itself about its longitudinal axis as said sheet moves in said direction, cutting means mounted on said platform adjacent the path of movement of said sheet in its folded condition to simultaneously trim both free edges of said sheet as it moves in said direction, means mounted on said platform adjacent said path to heat soften said edges after being trimmed by said cutting means, and rotatable means mounted on said platform in alignment with the longitudinal axis of said sheet in its folded and trimmed condition to change the direction of fold and force the said edges in their heat softened condition into abutting cohering contact with one another.

8. Apparatus as defined in claim 7 wherein said rotatable means further comprise a pair of axially spaced parallel rolls, means rotatably mounting said rolls on said platform with their axes perpendicular to the plane of the said sheet in its folded condition, and defining a plane perpendicular to said path, and means to rotate at least one of said rolls about its axis.

References Cited in the file of this patent

UNITED STATES PATENTS

| | | |
|---|---|---|
| 2,273,464 | Campbell et al. | Feb. 17, 1942 |
| 2,379,500 | Steffens | July 3, 1945 |
| 2,403,995 | Peters | July 16, 1946 |
| 2,509,715 | Allen et al. | May 30, 1950 |
| 2,529,732 | Howard | Nov. 14, 1950 |
| 2,647,555 | Hinman | Aug. 4, 1953 |
| 2,688,996 | Loomis | Sept. 14, 1954 |
| 2,722,590 | Engler | Nov. 1, 1955 |
| 2,934,130 | Lane et al. | Apr. 26, 1960 |

FOREIGN PATENTS

| | | |
|---|---|---|
| 713,003 | Germany | Oct. 31, 1941 |